Figures 1, 2:
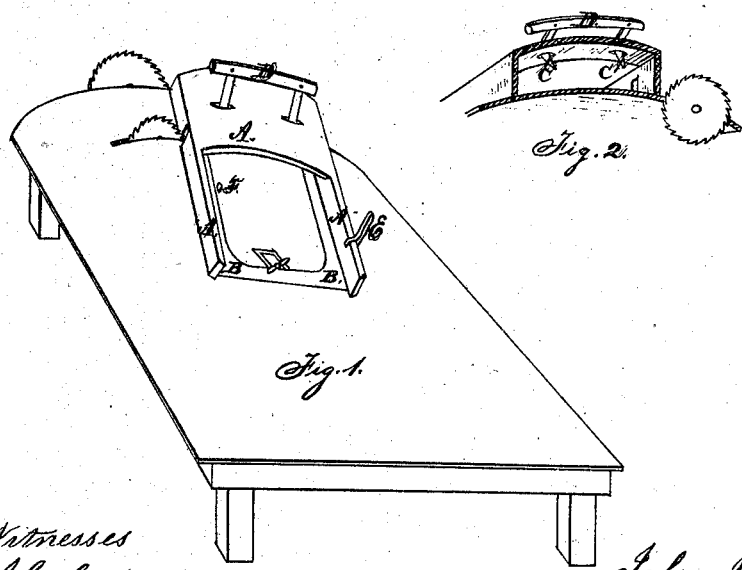

J. Walling.
Making Fellies.
No. 100,471.  Patented Mar. 1, 1870.

Witnesses
A. C. Capron
D. G. Capron

John Walling.
Plymouth Ind.

United States Patent Office.

JOHN WALLING, OF PLYMOUTH, INDIANA.

Letters Patent No. 100,471, dated March 1, 1870.

IMPROVEMENT IN SAWING-MACHINE.

The Schedule referred to in these Letters Patent and making part of the same

*To all whom it may concern:*

Be it known that I, JOHN WALLING, of the town of Plymouth, county of Marshall, and State of Indiana, have invented a new and useful Machine for Sawing Circular Pieces of Wood, such as wagon-wheel felloes, &c., on a circle of any given diameter; and I hereby declare that the following is a full and exact description thereof.

The name of the invention is "Walling's Improved Saw-Carriage and Guide," for sawing with dished circular saws.

The carriage is made of wood and heavy sheet-iron or other proper material, and the inside width is equal to the length of the chords of the segments to be cut, which may be of any required length.

The bottom of the carriage is made of sheet metal of proper strength, cut at the end next the saw or saws on the required circle.

The end of the carriage furthest from the saws is fastened to the table in which the saws run by a movable pivot, which is adjusted in reference to the circle to be cut.

A slot is cut in one side of the carriage through which the interior saw runs, and the end of the guide or carriage next the interior saw is made of the same circle as the saw which runs outside the guide.

A stop in the table stops the guide at the precise place required on being pushed and pulled forward and backward.

Through the upper cross-piece are lever dogs shaped like an L, which are hung on pivots at the angles, and the upright or lever ends connected with a movable handle of wood, which, being pressed toward the saws, holds the plank or board firmly in place.

On the side next the operator is a handle braced firmly into the carriage, by which the guide is partially operated.

A represents the carriage, which is placed upon a suitable frame or table.

B is the metal strip around the inner part of the carriage.

C C are the lever dogs, which are connected to the movable handle D.

E is the side handle to the carriage A; and

F is the stop.

What I claim is—

The combination, herein shown and described, upon a suitable frame, with the dished saws, of the pivoted carriage A, metal strip B, movable handle D, with with dogs C C, handle E, and stop F, as set forth.

JOHN WALLING.

Witnesses:
 A. C. CAPRON,
 A. B. CAPRON.